United States Patent Office 3,518,582
Patented June 30, 1970

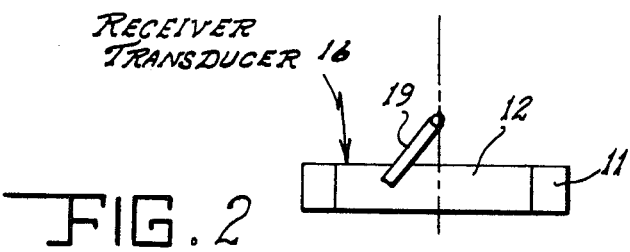
FIG. 2
FIG. 3
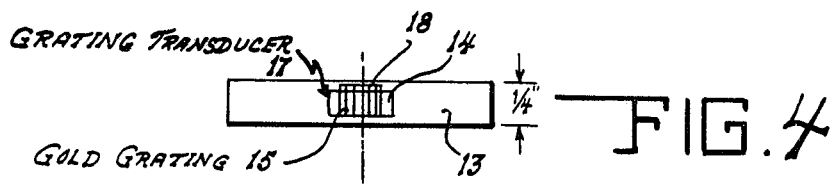
FIG. 4
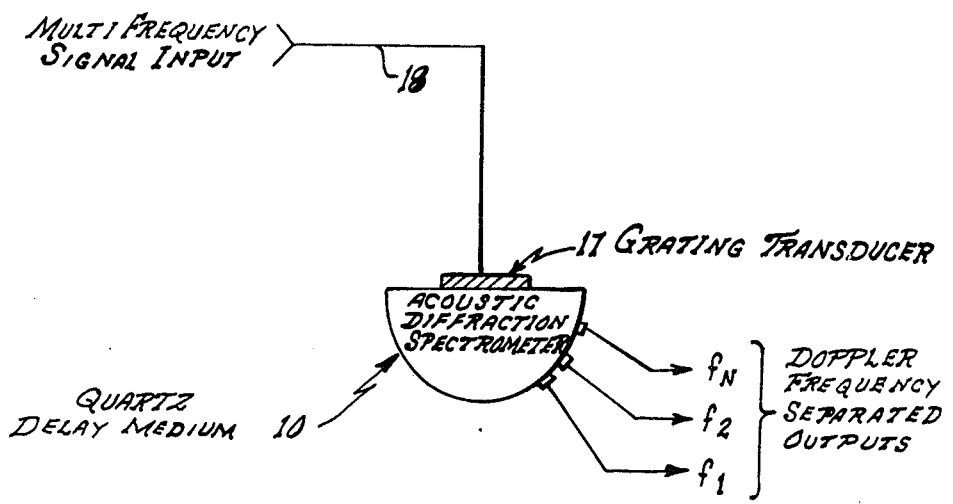
FIG. 6

3,518,582
ACOUSTIC DIFFRACTION SPECTROMETER AND METHOD OF FABRICATION THEREOF
Frank A. Pizzarello, Santa Ana, and John Beny Harrington, Los Alamitos, Calif., assignors to the United States of America as represented by the Secretary of the Air Force
Filed June 21, 1968, Ser. No. 739,015
Int. Cl. H03h 7/30, 9/00; H01v 7/00
U.S. Cl. 333—30                                        6 Claims

ABSTRACT OF THE DISCLOSURE

The method of fabricating an acoustic device to provide an acoustic device being capable of discriminating a multiple frequency input with the acoustic device having a periodic array of CdS transducers which operates to displace a given R-F frequency through a particular angle in an acoustic media.

BACKGROUND OF THE INVENTION

This invention relates to an acoustic diffraction spectrometer and the method of fabrication thereof and particularly an acoustic diffraction device capable of discriminating a multiple frequency input.

The present invention includes a mode of operation related to diffraction delay lines. The prior art diffraction delay lines have been limited to operating frequencies below 100 mHz. Some prior art diffraction delay lines are described by R. S. Duncan, and M. R. Parker, Jr., in "The Perpendicular Diffraction Delay Line, A New Kind of Ultrasonic Dispersive Device," Proc. IEEE (Correspondence), vol. 53, April 1965, pp. 413–414 and also described by G. A. Coquin and R. Tsu, in "Theory and Performance of Perpendicular Diffraction Delay Line," IEEE Proceedings, vol. 53, June 1965, pp. 581. The present invention provides a device capable of operation over a frequency bandwidth of 150 mc. at a center frequency of 500 mHz., with further experimental evidence indicating that the frequency of operation may be further increased to 1000 mHz. The prior art does not permit a frequency range of this magnitude.

Also in the present invention thin film transducers are used which are made by the evaporation of CdS (cadmium sulfide). Using this technique allows simple fabrication of complicated transducer shapes. The method used in present day devices involves individual elements of a transduced material bonded acoustically to a delay media to make up a total grating array. The technique involved in bonding these transducers is complicated and if not done correctly introduces large losses to the system. This system also seriously hampers the upper frequency limit of operation achievable.

SUMMARY OF THE INVENTION

In the method of fabrication of the acoustic device of the present invention, a quartz line is provided. The quartz has at least two opposite surfaces, one of which is flat and the other cylindrical. Both of the surfaces are optically polished and then have deposited thereupon a gold film of predetermined thickness. A grating is formed on the flat surface by the technique of photo-resist masking and etching. CdS is then evaporated on both surfaces by the method of co-evaporation over predetermined areas.

Operation of the device formed by the aforementioned fabrication method is achieved by placing an input contact on the grating transducer at the flat side and a moveable pressure contact, the transducer on the cylindrical side, or multiple outputs, on the transducer located on the cylindrical side. An R-F pulse is delivered to the grating transducer. The input pulse is diffracted in accordance with the Fraunhoffer equation $mV/f=d \sin \theta$. In this equation $m$ is the order of diffraction (0, 1, 2, etc.), V the velocity of sound in the delay media, $f$ the frequency, $d$ the distance of separation of the grating elements and $\theta$ the angle of difffraction. Consequently, this equation predicts a given diffraction angle for a particular frequency input.

One of the specific applications of the acoustic device of this invention is that of a radar Doppler processor. The device provides an instantaneous frequency separation capability.

An object of the present invention is to provide a method of fabrication of an acoustic device capable of discriminating a multiple frequency input.

Another object of the present invention is to provide a method of fabrication of an acoustic diffraction spectrometer.

Yet another object of the present invention is to provide an acoustic device capable of discriminating a multiple frequency input.

Still another object of the present invention is to provide an acoustic diffraction spectrometer for utilization as a radar Doppler processor.

The various features of novelty which characterize this invention are pointed out with particularity in the claims annexed to and forming a part of this specification. For a better understanding of this inventon, however, its advantages and specific objects obtained with its use, reference should be had to the accompanying drawings and descriptive matter in which is illustrated and described a preferred embodiment of the invention.

BRIEF DESCRIPTION OF THE DRAWINGS

In the drawings:
FIG. 2 shows a bottom view of FIG. 1;
FIG. 3 shows an inverted side view of FIG. 1;
FIG. 4 shows a top view of FIG. 1;
FIG. 6 shows a side view of the acoustic device of FIG. 1 with multiple outputs substituted for the moveable pressure output, the device being utilized as a radar Doppler processor.

DESCRIPTION OF THE PREFERRED EMBODIMENTS

Figure 1:
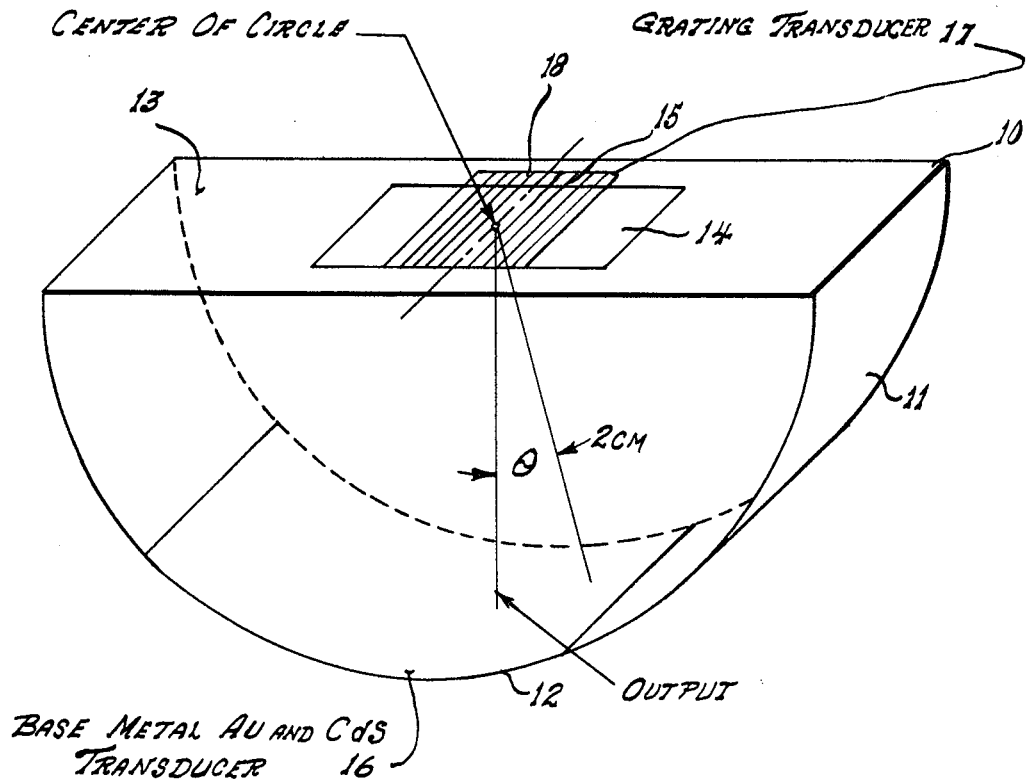
FIG. 1 shows a view in perspective of the acoustic device fabricated by the method of the invention.

Now referring in detail to FIG. 1, there is shown quartz delay medium 10 which is in the shape of half a cylinder having a preselected length. Quartz delay medium 10 may be a suprasil quartz line. Now referring to FIG. 2 showing a bottom view of FIG. 1, there is shown cylindrical surface 11. Cylindrical surface 11 is optically polished. Then a one micron gold film is deposited on area 12 of the optically polished surface. The gold deposit is done in the conventional manner. CdS is then evaporated on area 12 by the conventional method of co-evaporation, thus providing base metal gold and CdS transducer which may be referred to as receiving transducer 16.

Now referring to FIG. 4, there is shown the top view of FIG. 1. Flat surface 13 is optically polished. There is also deposited in area 14 by conventional method a one micron gold film. Grating 15 is formed on flat surface 13 by the conventional technique of photoresist masking and etching. CdS is also evaporated on area 14 by the conventional method of co-evaporation thus providing gold grating and CdS transducer which may be referred to as grating transducer 17 and is a multielement array.

Operation of the device formed by the above method of fabrication is done by placing input contact 18 on grating transducer 17 and movable pressure contact 19, or multiple outputs, on receiving transducer 16 at any desired location. An R-F pulse is delivered to grating transducer 17 by way of input contact 18. The input pulse is diffracted according to the Fraunhoffer equation $$mV/f = d \sin \theta$$

In this equation $m$ is the order of diffraction (0, 1, 2, etc.), $V$ the velocity of sound in the delay media 10 (quartz), $f$ the frequency, $d$ the distance of separation of the grating elements and $\theta$ the angle of diffraction. It is noted $\theta$ is shown in both FIGS. 1 and 3 and the radius of quartz medium 10 is also indicated in FIG. 3. It is also seen in FIG. 4 that the thickness (length) of quartz medium 10 is in this instance ¼″.

Figure 5:
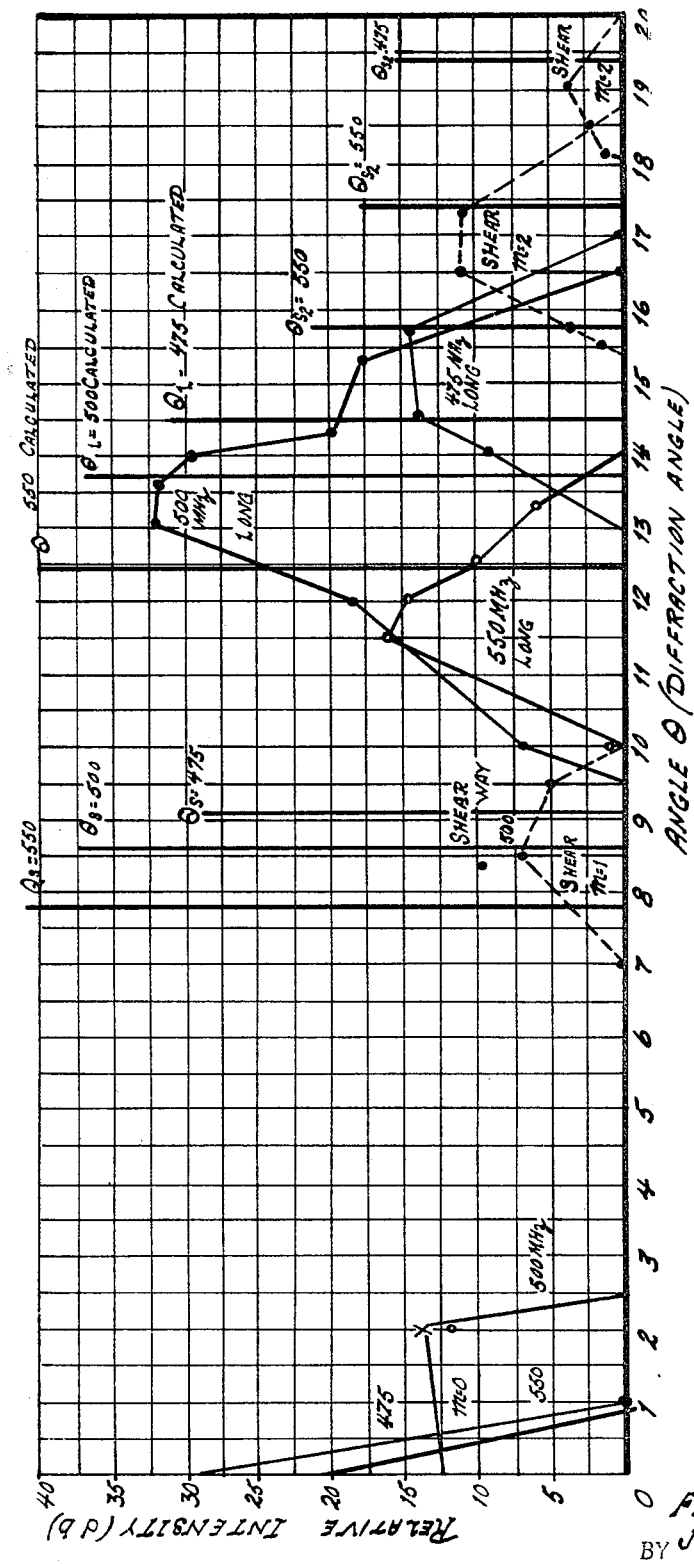
FIG. 5 illustrates the effect in the acoustic device of FIG. 1 as a function of frequency and diffraction angle.

Now referring again to the foregoing equation and the discussion thereof, it predicts a given diffraction angle for a particular frequency input. FIG. 5 is given to show this effect as a function of frequency and diffraction angle. The three solid peaks shown are the results of diffraction of a longitudinal mode sound wave of three different frequency inputs 475 mHz., 500 mHz. and 550 mHz. An unexpected generation of shear mode sound is also detected by the dotted line peaks. Thus, there is provided an acoustic device capable of discriminating a multiple frequency input based on the Fraunhoffer diffraction theory. The acoustic device includes a periodic array of CdS transducers which operates to displace a given R-F frequency through a particular angle in an acoustic delay media.

Now referring in detail to FIG. 6, there is shown the acoustic device of the invention which is referred to as an acoustic diffraction spectrometer and in this following application utilized as a Doppler processor. The device provides an instantaneous frequency separation capability.

A multi-frequency electrical signal is applied by way of input contact 18 to diffraction grating transducer 17 which responds mechanically to the electrical signal and couples the signal, in the form of ultrasonic vibrations, into quartz delay medium 10 from finite grating elements along diffraction grating transducer 17. Since the radiation is effectively from a multielement array, diffraction occurs which orderly spreads the energy spacially, according to the instantaneous frequency components. Output transducers $f_1, f_2 \ldots f_N$ are substituted for the moveable pressure output transducer of FIG. 1. Output transducers $f_1, f_2 \ldots f_N$, located at predetermined angular locations with respect to diffraction grating transducer 17, convert the intercepted waves back into electrical signals. There will be a specific frequency associated with each angle and each output transducer. Each output forms a Doppler filter with center frequencies $f_1, f_2 \ldots f_N$. The bandwidth of the filter is determined by the aperture or spatial angle covered by the transducer. The acoustic diffraction spectrometer may be incorporated into a complete system as an analog doppler frequency separator. Each output "channel" may then be processed in either analog or digital fashion.

The acoustic diffraction spectrometer is especially useful as a Doppler processor because it performs the function of many bandpass filters in parallel in a single solid-state device. Other applications of the acoustic diffraction spectrometer include: electronically variable delay lines, dispersive delay lines, time inverter, scanning correlators, and radar scanning simulation.

It is noted that the experimental model was made to operate over a frequency bandwidth of 150 mc. at a center frequency of 500 mHz. Experimental evidence indicates that the frequency of operation may be further increased to 1000 mHz.

While in accordance with the provisions of the statutes, we have illustrated and described the best form of the invention now known to us, it will be apparent to those skilled in the art that changes may be made in the form of the apparatus disclosed without departing from the spirit of the invention as set forth in the appended claims, and that in some cases certain features of the invention may be used to advantage without a corresponding use of other features.

Having now described our invention, what we claim as new and desire to secure by Letters Patent is:

1. The method of fabricating from a delay medium, having two opposite surfaces one flat and the other cylindrical, an acoustic device capable of discriminating a multiple R-F frequency input comprising optically polishing said flat and cylindrical surfaces, depositing a gold film of preselected thickness in predetermined areas on each of said opposite surfaces, forming a grating on said flat surface in the area of said gold film by photo resist masking and etching, and evaporating cadmium sulfide over said predetermined areas.

2. The method of fabricating an acoustic device as described in claim 1 further including forming an input contact to said grating for reception of said multiple frequency input and forming multiple outputs over preselected points of said cylindrical surfaces.

3. An acoustic device including a delay medium having two opposite optically polished surfaces, one flat and the other cylindrical, with the acoustic device operating to discriminate a multiple R-F frequency input comprising a periodic array of cadmium sulfide transducers located on said flat surface, and a cadmium sulfide output transducer positioned on said cylindrical surface.

4. An acoustic device as described in claim 3 further including input means to said periodic array for the reception of said multiple frequency input.

5. An acoustic device as described in claim 4 further including a moveable pressure output contact for said cadmium sulfide output transducer, said acoustic device operating to displace a given R-F frequency input through a particular angle in said acoustic delay medium, 6. An acoustic delay device as described in claim 4 further including multiple output points located over the area of said cadmium sulfide transducer, each of said output points corresponding to one of said frequencies of said multiple R-F frequency input, said acoustic device operating to displace a given R-F frequency input through a particular angle in said acoustic delay medium,

References Cited

UNITED STATES PATENTS 3,300,739   1/1967   Mortley _____ 333—30

ELI LIEBERMAN, Primary Examiner

M. NUSSBAUM, Assistant Examiner

U.S. Cl. X.R.

310—8.1; 333—72